(12) United States Patent
Shimizu et al.

(10) Patent No.: US 7,024,176 B2
(45) Date of Patent: Apr. 4, 2006

(54) CELLULAR TELEPHONE DEVICE AND TRANSMITTER TO CELLULAR TELEPHONE

(75) Inventors: Hiroshi Shimizu, Yokohama (JP); Masahiko Saito, Mito (JP); Atsushi Ogino, Kodaira (JP); Jun Maeoka, Kawasaki (JP); Nobuaki Kohinata, Yokohama (JP); Shinichi Obata, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 473 days.

(21) Appl. No.: 10/119,307

(22) Filed: Apr. 10, 2002

(65) Prior Publication Data

US 2003/0109246 A1 Jun. 12, 2003

(30) Foreign Application Priority Data

Dec. 11, 2001 (JP) .............................. 2001-376663

(51) Int. Cl.
*H04M 1/66* (2006.01)
*H04M 1/68* (2006.01)
*H04M 3/16* (2006.01)

(52) U.S. Cl. ................... 455/411; 455/456; 455/404.1; 455/414; 455/432.1; 455/436; 455/574; 455/421; 379/421

(58) Field of Classification Search ................ 455/414, 455/432.1, 436, 456, 404.1, 574; 379/421
See application file for complete search history.

(56) References Cited

U.S. PATENT DOCUMENTS 4,825,457 A * 4/1989 Lebowitz ..................... 379/40

| | | | |
|---|---|---|---|
| 6,002,763 A * | 12/1999 | Lester et al. ................. | 379/421 |
| 6,088,602 A * | 7/2000 | Banister ...................... | 455/574 |
| 6,173,169 B1 * | 1/2001 | Oh ........................... | 455/404.1 |
| 6,434,395 B1 * | 8/2002 | Lubin et al. ................. | 455/466 |
| 6,697,103 B1 * | 2/2004 | Fernandez et al. .......... | 348/143 |
| 6,760,583 B1 * | 7/2004 | Ito et al. ..................... | 455/425 |
| 2001/0049275 A1 * | 12/2001 | Pierry et al. ................ | 455/414 |
| 2002/0098119 A1 * | 7/2002 | Goodman ................. | 422/82.01 |
| 2002/0109706 A1 * | 8/2002 | Lincke et al. ............... | 345/700 |
| 2002/0119788 A1 * | 8/2002 | Parupudi et al. ............ | 455/456 |

FOREIGN PATENT DOCUMENTS

| CN | 1272758 A | 11/2000 |
|---|---|---|
| EP | 1 041 847 A1 | 10/2000 |
| JP | 2-32684 | 2/1990 |
| JP | 2001-224064 | 8/2001 |
| JP | 2001-224075 | 8/2001 |
| JP | 2001-326976 | 11/2001 |
| JP | 2001-326977 | 11/2001 |
| WO | WO 00/39942 | 7/2000 |

* cited by examiner

*Primary Examiner*—William Trost
*Assistant Examiner*—Chuck Huynh
(74) *Attorney, Agent, or Firm*—McDermott Will & Emery LLP

(57) ABSTRACT

There are provided a cellular telephone device and transmitter for setting a cellular telephone to answering mode and a telephone section to sleep status when communication forbidding information is received, and restoring telephone section operation when there is no communication forbidding information and canceling silent mode and answering mode; and automatically setting silent mode and answering mode when a communication forbidding signal is received, and maintaining the telephone section operation status when there is no communication forbidding information, and canceling silent mode and answering mode.

2 Claims, 17 Drawing Sheets

FIG. 7A
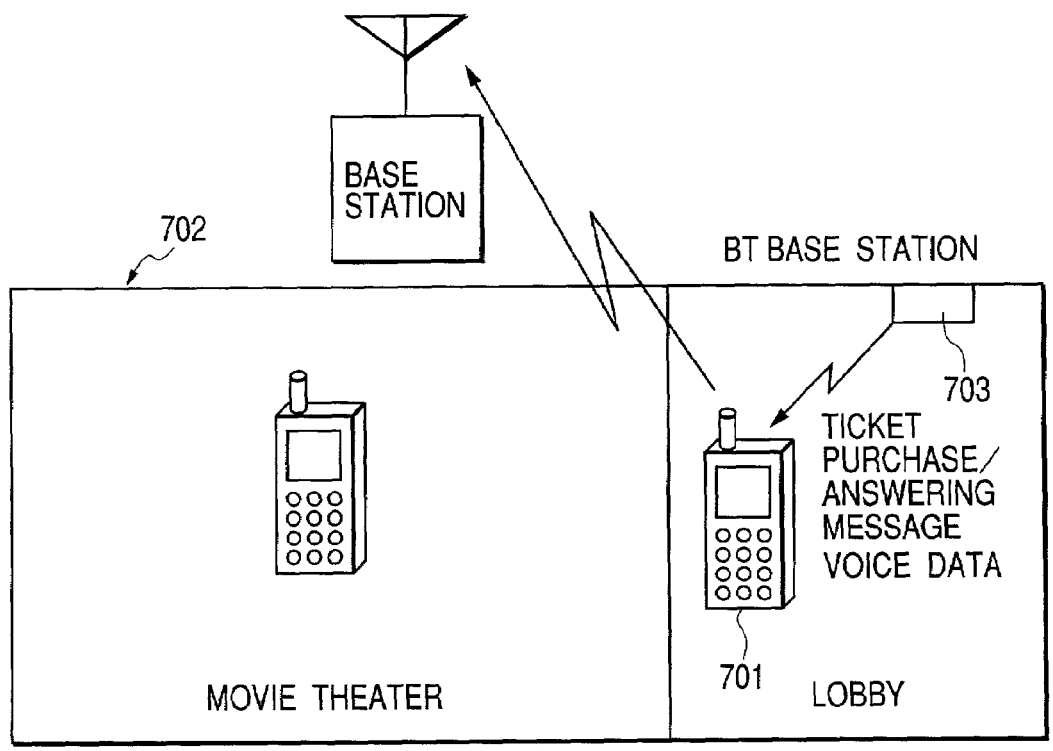
FIG. 7B
| TICKET ID | —704 |
| MOVIE STARTING TIMES | —705 |
| MOVIE ENDING TIMES | —706 |
| ANSWERING VOICE MESSAGE | —707 |
| PROHIBIT MODE | —708 |
FIG. 7C
MOVIE RUNNING TIMES
=COMMUNICATION
PROHIBIT TIME ZONE
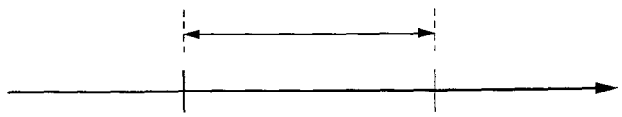

FIG. 8A

| | |
|---|---|
| 801 | ADDRESS ID |
| 802 | (FULL) NAME |
| 803 | TELEPHONE NO. |
| 804 | E-MAIL ADDRESS |
| | ...... |
| 805 | MESSAGE LEVEL |

FIG. 8B

| | |
|---|---|
| 1 | (NO RESPONSE) |
| 2 | "UNABLE TO ANSWER THE PHONE" |
| 3 | "UNABLE TO ANSWER THE PHONE, PLEASE LEAVE A MESSAGE" |
| 4 | "NOW SEEING A MOVIE" |
| 5 | "NOW SEEING A MOVIE. IT WILL END AT X:XX." |

807, 808, 809, 810, 811

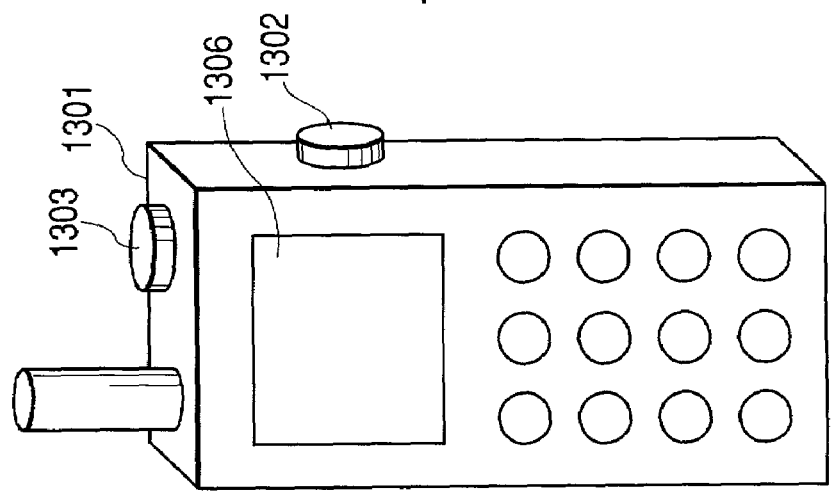
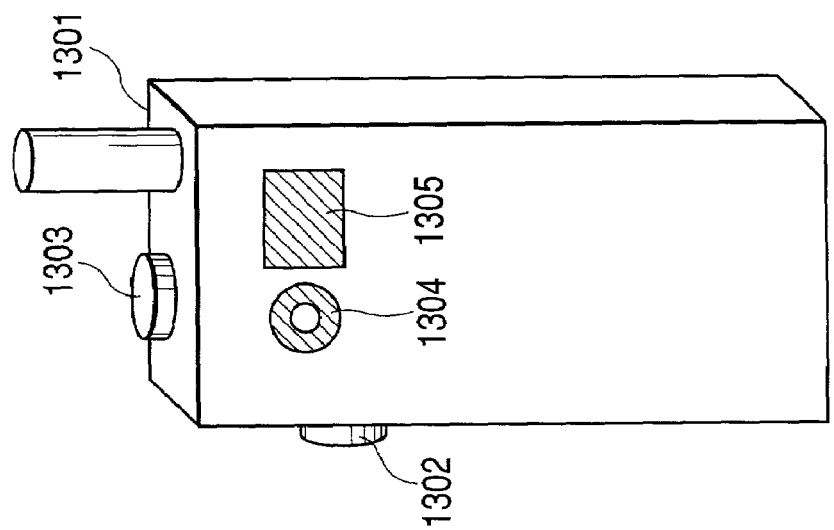
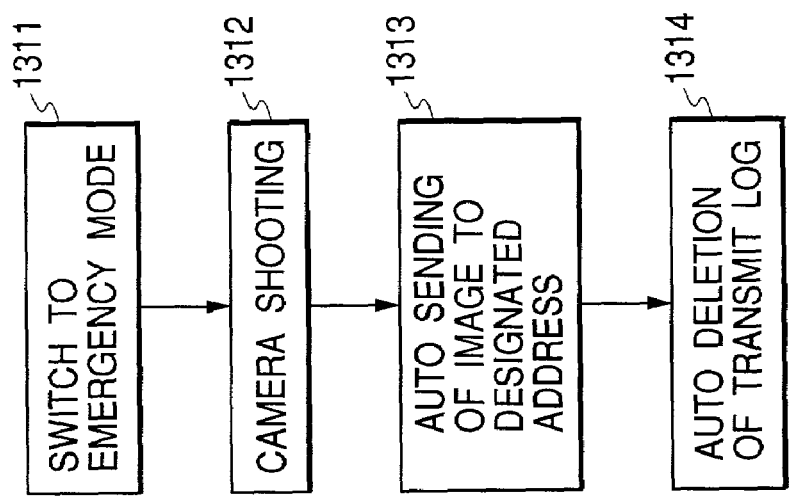

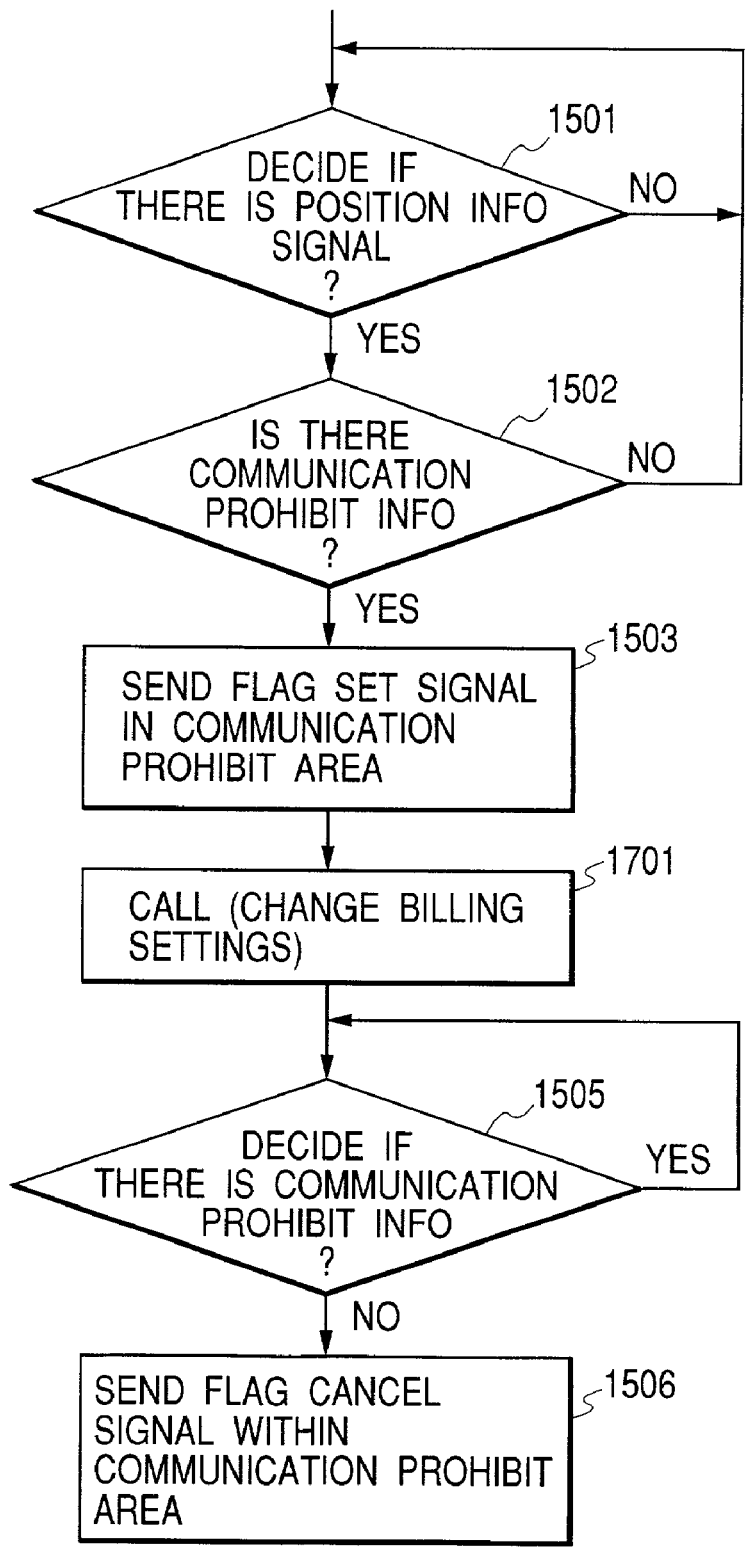

CELLULAR TELEPHONE DEVICE AND TRANSMITTER TO CELLULAR TELEPHONE

FIELD OF THE INVENTION

The present invention relates to a cellular telephone device and a transmitter for transmitting to cellular telephones and more particularly to cellular telephone technology and a transmitter for transmitting to cellular telephones for switching the cellular telephone mode to sleep mode or silent mode or answering mode in a specified location, time, circumstances or environment, and automatically turning off the transmission.

DESCRIPTION OF THE RELATED ART

Along with the widespread use of cellular telephones, the problems of bad manners when using cellular telephones and adverse effects from radio waves have appeared. For example, to prevent annoying other people by using cellular telephones, public traffic systems such as for buses and trains make announcements within the bus or train compartment requesting that passengers refrain from using cellular telephones. However, this request is not always obeyed. Hospitals and medical clinics post signs and make announcements requesting that cellular telephones be turned off, but these cellular telephones are often willfully or by mistake left on. To prevent annoying or inconveniencing others, places such as theaters, movie theaters and concert halls post signs and make announcements to inform people that cellular telephones should be turned off while viewing a play, a movie or a music performance, but this warning is not always complied with. People also continue to use cellular telephones while driving in spite of the fact that many accidents occur due to use of cellular telephones while driving automobiles.

Technology is disclosed in Japanese Unexamined Patent Publication No. 224064/2001 for a cellular telephone information terminal (hereafter cellular phone terminal) for storing reference point position information ahead of time in a reference point memory section, measuring the position of the cellular phone terminal by GPS (Global Positioning System) processing, calculating the distance from the cellular phone terminal position to the reference point in a distance data processor and comparing it with a specified threshold value, and when within the threshold, allowing calls to be made from the cellular telephone by control from a call controller, and when in excess of the threshold forbidding or prohibiting calls from being made.

Japanese Unexamined Patent Publication No. 224075/2001 discloses a cellular mobile communication terminal capable of making reliable manner mode settings for use in medical equipment offices, or during viewing of movies in movie theaters, during musical performances at concerts, or when driving an automobile etc. The cellular mobile communication terminal comprises a manner (silent) mode schedule memory section for storing a year, month, day and time period for setting manner mode with a scheduling function; and a manner controller for setting manner mode to stop a portion of the cellular mobile communication terminal functions for the year, month, day and time period that were set in the manner mode schedule memory section.

Japanese Unexamined Patent Publication No. 326976/2001 discloses a mobile terminal for sending position information from a GPS receiver section by way of multiple base stations to a switchboard, the switchboard stores the received position information of the mobile terminal, and by comparing the previous position information with the current position information and calculating the differential, can calculate the speed of the mobile terminal, determine whether or not the mobile terminal is moving at high speed, and implement call limiting with a call regulating system.

Japanese Unexamined Patent Publication No. 326977/2001 discloses a cellular telephone to automatically stop transmit functions when the user enters a location where radio waves must not be transmitted and restoring transmit functions when leaving that location, and further informing the user of this operation.

In the conventional cellular telephone, as mentioned previously, actions such as turning off the cellular telephone or switching to answering mode are entrusted entirely to the cellular telephone user and so rules governing these actions are not always complied with. Use of cellular telephones however, is not only is a great source of annoyance to other people but may also cause accidents so that a system for automatically turning off the telephone or setting it to answering mode is needed according to the specified location, time, circumstances or environment.

The technology of Japanese Unexamined Patent Publication No. 224064/2001 has the problem that setting of reference points is required. Another problem is that clearly determining an area where calls are forbidden or prohibited is difficult since the GPS accuracy is poor. The area is also circular so specifying an area where calls are forbidden is impossible by using only the distance. Also, GPS cannot be used inside buildings.

The technology of Japanese Unexamined Patent Publication No. 224075/2001 has the problem that the user must set the manner mode in order to utilize the scheduling functions, and this is troublesome for the user. Automatic setting of the manner (silent) mode is needed.

In the technology of Japanese Unexamined Patent Publication No. 326976/2001, a processor calculates the movement speed by utilizing GPS, however constant use of GPS consumes much power in the mobile terminal. A method to lower the processing load and reduce power consumption is required.

In the technology of Japanese Unexamined Patent Publication No. 326977/2001, a forbidding signal is paired with a permit signal, so if transmit was stopped with the forbidding signal, then transmit remains stopped (forbidden) until a permit signal is received. This transmit stop condition therefore is still maintained if the user does not pass through a pre-established public entrance or exit, or emergency exit, etc. A method is therefore required to automatically permit transmitting calls when outside of a communication forbidden area.

SUMMARY OF THE INVENTION

The present invention therefore has the object of resolving the aforementioned problems of the related art by providing a cellular telephone capable of automatically switching cellular telephone modes by utilizing information relating to location, time and circumstances.

To achieve the above mentioned objects, in a first aspect of the present invention, a cellular telephone device sends an answering mode registration request signal when communication forbidding information is received, maintains the telephone section in sleep status, and restores telephone section operation when communication forbidding (or prohibit) information is no longer received, and sends an answering mode cancel request signal.

In a cellular telephone device of a second aspect of the present invention, the field intensity of radio waves from a first base station and the field intensity of radio waves from a second base station are measured at periodic intervals, changes in field strength over a unit of time are detected, and when determined to be moving, the cellular telephone device sends an answering mode registration request signal, maintains the telephone section in sleep status, and when movement can no longer be detected, restores the telephone section restored to operation and sends an answering mode request cancel signal.

In a third aspect of the present invention, the cellular telephone device sends an answering mode registration request signal when communication forbidding information is received specifying the cellular telephone, and maintains the telephone section in sleep status, and restores telephone section operation when communication forbidding information is no longer received, and sends an answering mode cancel request signal.

In a fourth aspect of the present invention, the cellular telephone is input with a communication forbidden time period when the user enters a specified area, and sends a registration mode request signal when the communication forbidden time arrives, and maintains the telephone section in sleep status, and when the communication forbidden time has elapsed, operation of the telephone section is restored, and an answering mode cancel request signal is sent.

In a fifth aspect of the present invention, a smell sensor capable of detecting specific smells (odors) is installed in the cellular telephone device, and when the smell sensor detects the specific smell, then that area is determined to be a communication forbidden area, an answering mode registration request signal is sent, the telephone section is maintained in sleep status, and when the smell can no longer be detected, an answering mode cancel request signal is sent.

In a sixth aspect of the present invention, when the cellular telephone device receives communication forbidding information, an answering mode registration request signal is sent, the telephone section is maintained in sleep status, and emergency mode is set when communication forbidden status is canceled, and calls can be made to a specified other party.

In a seventh aspect of the present invention, the cellular telephone device is comprised of a camera and emergency mode switcher means, and when set to emergency mode by the emergency mode switcher means, automatic shooting with the camera is performed and sent to a pre-specified address.

In an eighth aspect of the present invention, the cellular telephone device is further comprised of a voice signal output means, and a speaker to change the output from the voice signal output means to voice audio, and an audio quality degradation means, and when a communication or communication forbidding information is received, the audio quality degradation means is connected between the voice signal output means and the speaker.

In a ninth aspect of the present invention, the cellular telephone device further comprised of billing change data, and when a communication or communication forbidding information is received, a change of settings into the extra-charge mode is automatically performed.

In a tenth aspect of the present invention, when the cellular telephone device receives communication forbidding information, the telephone section is maintained in operating status, silent mode and answering mode are set, and when communication forbidding information is no longer received, the silent mode and answering mode are automatically canceled.

In a cellular telephone device of an eleventh aspect of the present invention, the field intensity of radio waves from a first base station and the field intensity of radio waves from a second base station are measured at periodic intervals, changes in field strength over units of time are detected, and when determined to be moving, the telephone section is maintained in operating status, silent mode and answering mode are set, and when communication (call) forbidding information is no longer received, the silent mode and answering mode are automatically canceled.

In a cellular telephone device of a twelfth aspect of the present invention, a smell sensor capable of detecting specific smells (odors) is installed in the cellular telephone device, and when the smell sensor detects the specific smell, then that area is determined to be a communication (call) forbidden area, the telephone section is maintained in operating status, silent mode and answering mode are set, and when the smell can no longer be detected, the silent mode and answering mode are automatically canceled.

In a cellular telephone device of a thirteenth aspect of the present invention, the telephone section is maintained in operating status when communication (call) forbidding information is received, silent mode and answering mode are set, and emergency mode is set when communication forbidden status is canceled, and calls can be made to a specified other party.

These and other objects, features and advantages of the invention will be apparent from the following more particular description of the preferred embodiments of the invention as illustrated in the accompanying drawings.

BRIEF DESCRIPTION OF THE DRAWINGS

FIG. 6A is a drawing showing an example of installation of the cellular telephone system.

FIG. 6B is a drawing showing the communication forbidden area and communication enable area within a vehicle.

FIG. 7A is a concept view showing a fifth embodiment of the cellular telephone system of the present invention.

FIG. 7B is a drawing showing the cellular telephone table.

FIG. 7C is a drawing showing the communication forbidden time period.

FIG. 8A is drawing showing a main data table from typical data required in responses in answering mode.

FIG. 8B is a table showing typical responses.

FIG. 13A is a front side perspective view showing the third embodiment of the cellular telephone capable of transmitting images.

FIG. 13B is a rear side perspective view.

FIG. 13C is a flow chart showing the processing during cellular telephone emergency operation.

FIG. 17 is a flow chart showing an embodiment of the processing in the cellular telephone shown in FIG. 16.

DESCRIPTION OF THE PREFERRED EMBODIMENTS

The embodiments of the present invention are described hereafter while referring to the accompanying drawings.

Figure 1:
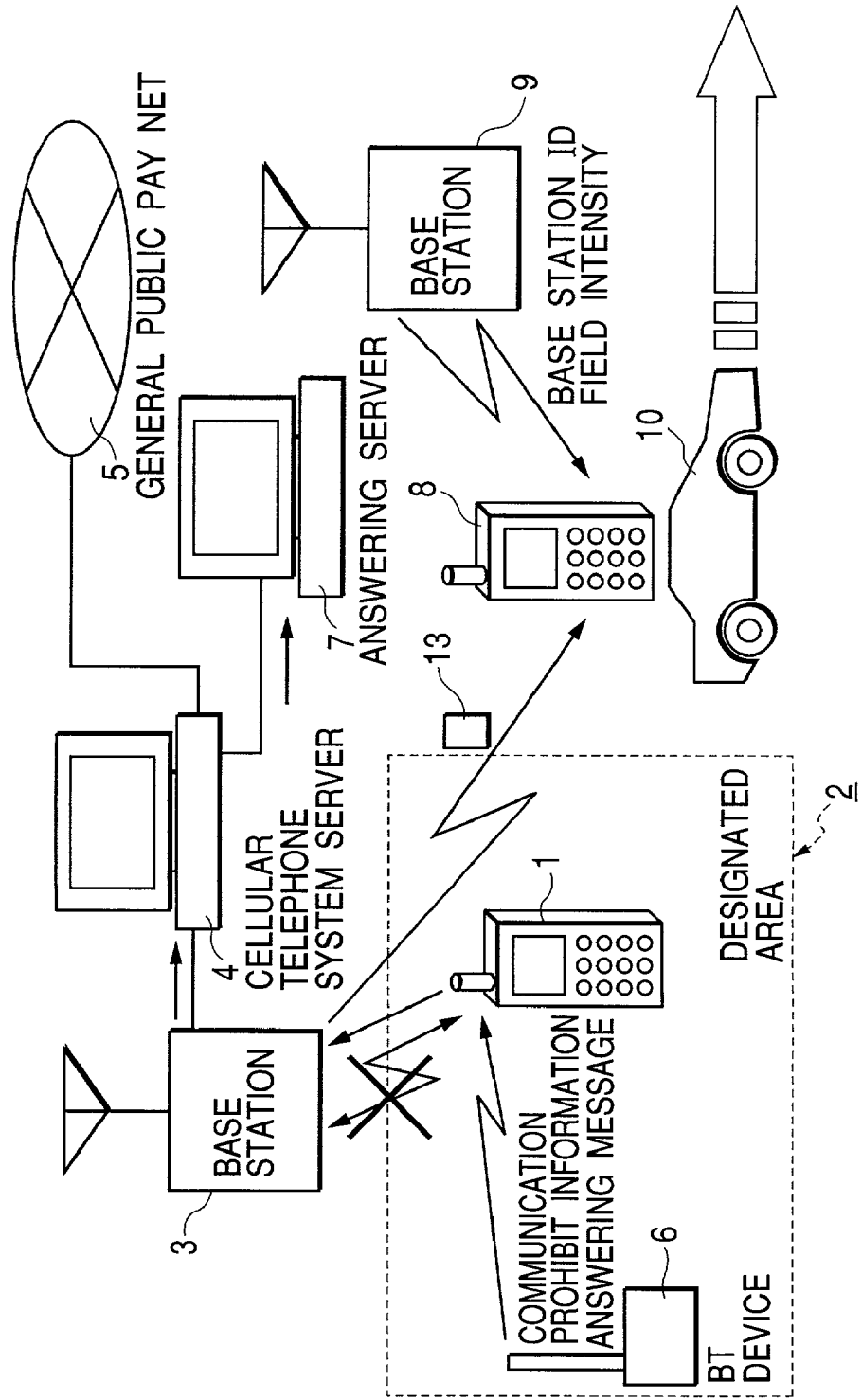
FIG. 1 is an overall concept view showing the first embodiment of the cellular telephone system of the present invention.

FIG. 1 is an overall concept view showing the first embodiment of the cellular telephone system of the present invention. A cellular telephone 1 in the figure is present within a designated area (or designated location) 2, and capable of communicating with a first base station 3. When radio waves are transmitted from the cellular telephone 1, these are received by a first base station 3, sent to a cellular telephone system server 4, and transmitted to the cellular telephone or fixed telephone of another party by way of a general public pay (telephone) net 5.

Figure 2:
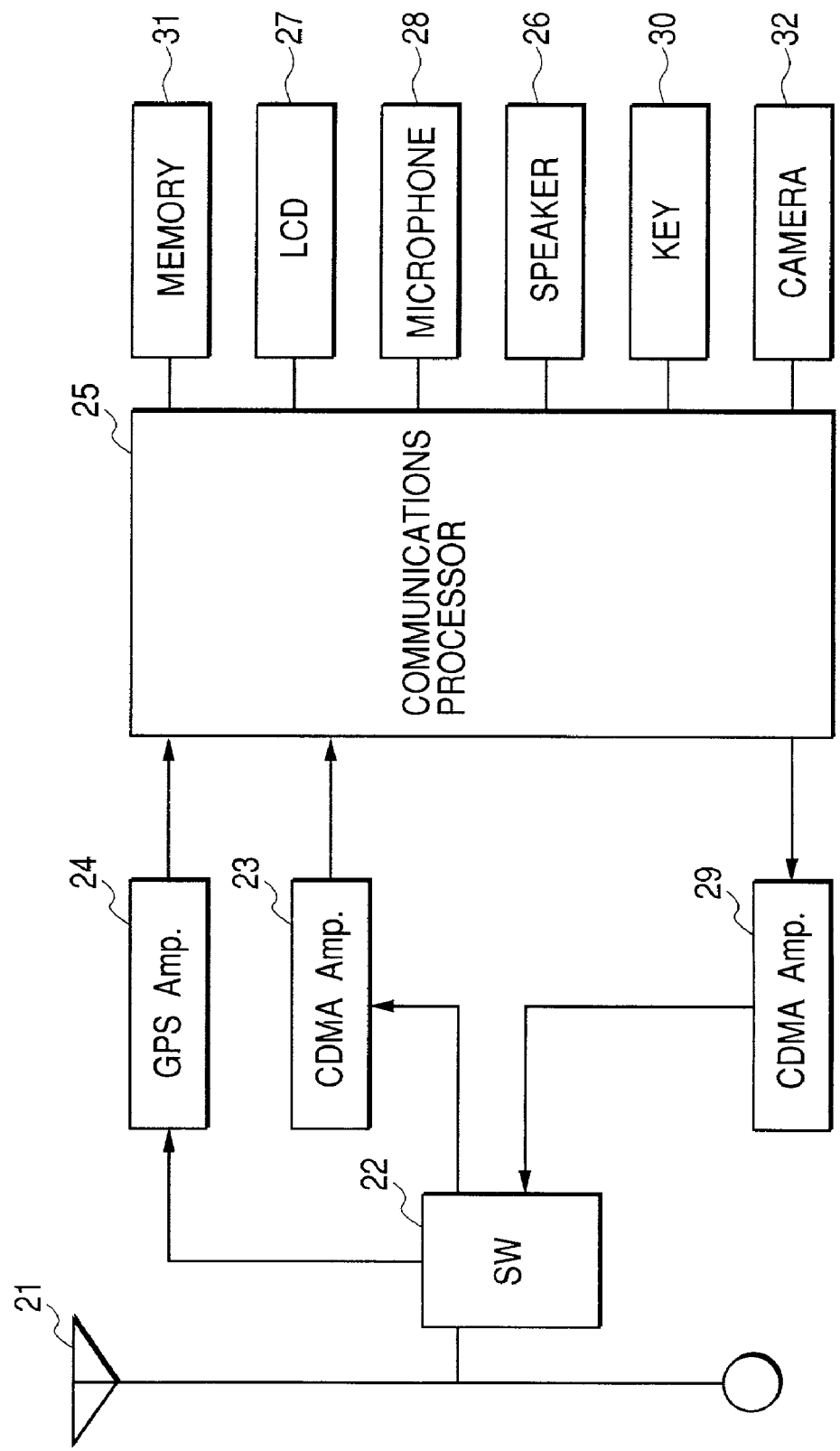
FIG. 2 is a block diagram showing an embodiment of the overall operation of the cellular telephone of the present invention.

FIG. 2 is a block diagram showing an embodiment of the overall operation of the cellular telephone of the present invention. In the figure, the CDMA (Code Division Multiple Access) signal and GPS (Global Positioning System) signal received from the antenna 21 are input via the transmit/receive selector switch 22 to the CDMA Amplifier 23 or the GPS amplifier 24 and communications processor 25 and voice audio is output from a speaker 26. In the case of electric mail (hereinafter mail), a display is shown on an LCD 27. Voice audio from the microphone 28 is output from the antenna 21 after passing the communication processor 25, the transmit CDMA Amplifier 29, and the switch 22. The keys 30 are provided for entering the telephone number or entering the mail characters in the cellular telephone. A memory 31 is also installed for recording different functions and telephone numbers. A camera 32 is also sometimes installed for sending images.

The communication forbidding signal from a Blue Tooth (hereinafter BT) the BT device 6 is input to the communications processor 25. The communications processor 25 utilizing this signal outputs an answering mode register request and along with performing answering mode registration, in RF mode switches to RF signal transmit stop and silent mode.

When the specified area 2 is an area forbidding use of cellular telephones, the BT device 6 is installed in that specified area 2, and a communication (call) forbidding information is output from the BT device 6. When the cellular telephone 1 receives this communication (call) forbidding information, this mode of this cellular telephone is automatically set to answering mode, and an answering mode registration request signal is sent to a first base station 1. This information is input via the cellular telephone system server 4 to the answering server 7, and the answering mode is registered. The cellular telephone 1 then stops operation of the RF (radio frequency) section. Or may automatically switch to silent mode. This designated area 2 may be a hospital or theater, etc. In this embodiment, an IrDA (Infrared Data Association) may be used instead of the BT device.

In the designated area 2 in FIG. 1, where calls or communication is forbidden, a message, "Communication is forbidden in this zone. You cannot use the phone here" is displayed on the cellular telephone 1. When nearing the designated area 2 where calls or communication are forbidden, a message, "You are nearing a communication (or call) prohibit zone." is displayed. When the cellular telephone 1 nears the designated area 2, the communication (or call) forbidding information becomes gradually more intense. A message may also be displayed when the communication (or call) forbidding information is a small level, namely, when a level smaller than a pre-established level is received, then a display may be made showing that the designated area 2 is close.

A BT device 13 may be installed outside the designated area 2, and made to output a signal notifying that the designated area 2 is near, in other words, outputting communication (call) forbidden area proximity information, and the cellular telephone that received this signal may display the message that the designated area 2 is near. This message may be shown not only on the display of the cellular telephone, but may also be announced by sound, voice, or vibration, etc.

The answering mode in the present invention performs any of accepting a telephone call instead of the telephone user, sending messages to another party instead of the telephone user, recording messages from the other party, or accepting a telephone call instead of the telephone user, sending messages to another party instead of the telephone user, or accepting a telephone call instead of the telephone user, and recording messages from the other party. These may all be performed by the answering server of the base station, or may be performed within the telephone. However, these are performed by the answering server of the base station under circumstances where radio waves must not be output.

In FIG. 1, the cellular telephone of the driver of an automobile can be automatically set to answering mode. The cellular telephone 8 is constantly communicating with a first base station 3 and a second base station 9. So when the cellular telephone 8 is moved by the automobile 10, the field strength of the radio waves for example of the first base station 3 become weaker, and the field strength of the radio waves of a second base station 9 become stronger, so that the field strength of the radio waves can be measured periodically and it can be known that the cellular telephone 8 is moving, by detecting changes in the field strength over units of time. When found to be moving, the cellular telephone 8 automatically sends an answering mode registration request, and performs answering mode registration. The RF section operation is then stopped and silent mode is automatically set.

Figure 3:
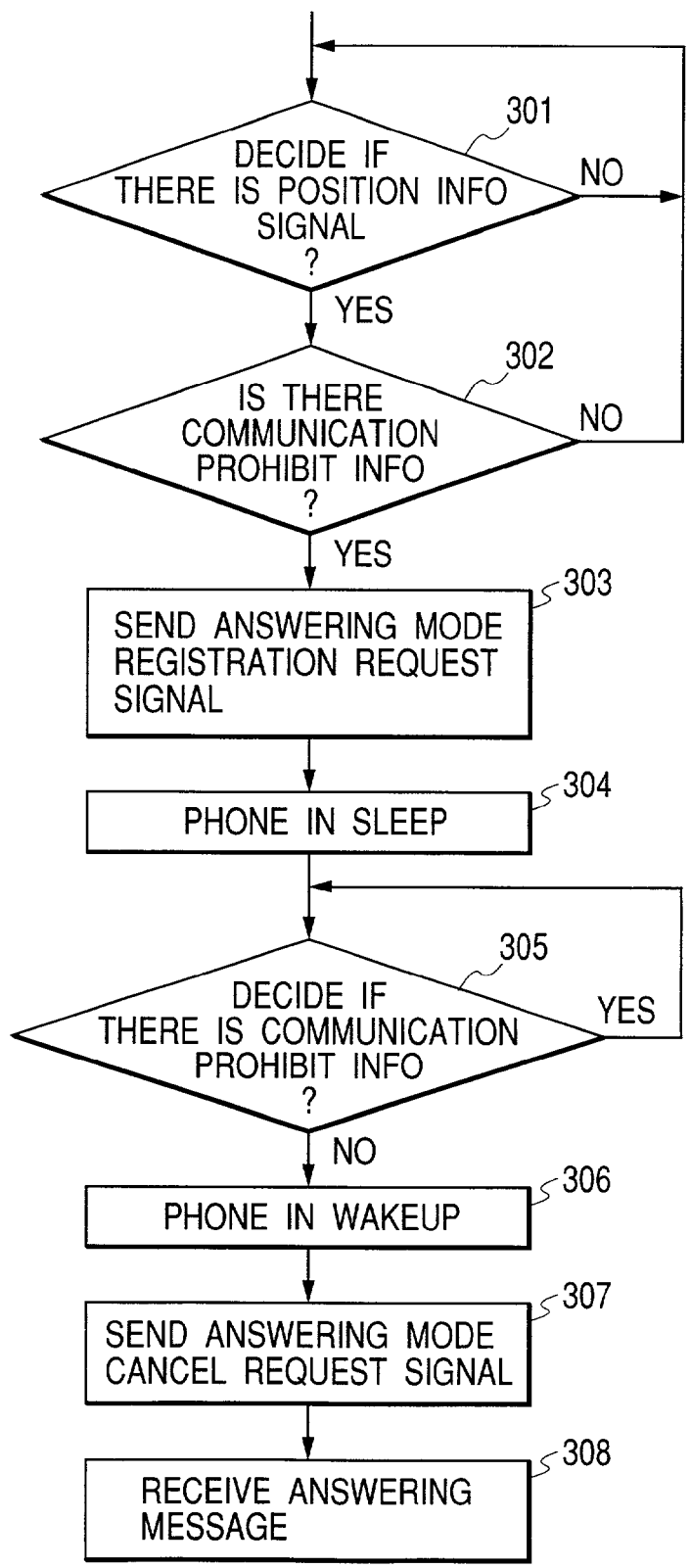
FIG. 3 is a flowchart showing an embodiment of the processing operation of the cellular telephone device of the present invention.

FIG. 3 is a flowchart showing an embodiment of the processing operation of the cellular telephone device of the present invention. In step 301 in the figure, a decision whether or not an information position signal was received from the BT device 6 is made. This operation is repeated if there is no position information signal. When there is a position information signal, a decision is made in step 302, whether communication forbidding information is contained in the position information signal. When there is communication forbidding information, the process shifts to step 303, an answering mode registration request signal is sent, and in step 304, the telephone section of the cellular telephone is set to sleep status, or in other words, no radio waves are sent. After setting the telephone to sleep status, as shown in step 305, a decision whether or not communication forbidding information is present is made. When decided in step 305 that there is no communication forbidding information, for example when leaving a communication forbidden area, the process shifts to step 306, the telephone section is set to wake up status, or in other words, operation is restored, the RF signal transmission resumes, and in step 307 an answering mode cancel request signal is sent, and in step 308 an answering message is received. Transmissions from the cellular telephone within the communication forbidden area are in this way automatically stopped, and when having left the communication forbidden area, the cellular telephone transmissions can be resumed.

In the present embodiment, it was explained that the telephone section was set to sleep status by the communication forbidding information and all telephone and mail communication was disabled in the designated area, however there is an area where communication such as phone calls are forbidden and other forms of communication such as mail are allowed. Mail for example is allowed in movie theaters and stages. In this case, communication forbidding information is sent from the BT device. The setting of silent mode and answering mode is also the same in this case however the telephone section is kept in operating status. The answering mode sends an answering mode registration request signal and may be registered in the answering server, or may be set in answering mode on the cellular telephone. In this case, when a call is received, it is automatically recorded on the cellular telephone. Further, upon moving outside the communication forbidden area, when the communication forbidding information is no longer received, the voice message recorded in answering mode can be heard.

Also, in silent mode, the key sounds are automatically set to silent status.

Figure 11A:
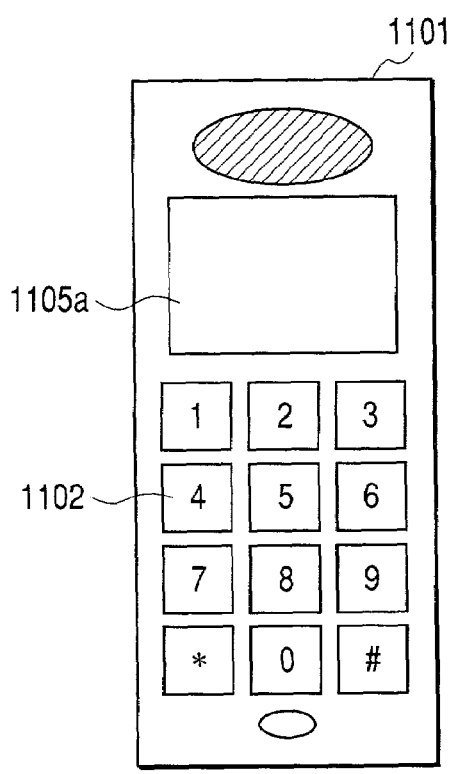
FIG. 11A is a front view showing a first embodiment of the cellular telephone of the present invention.
Figure 12A:
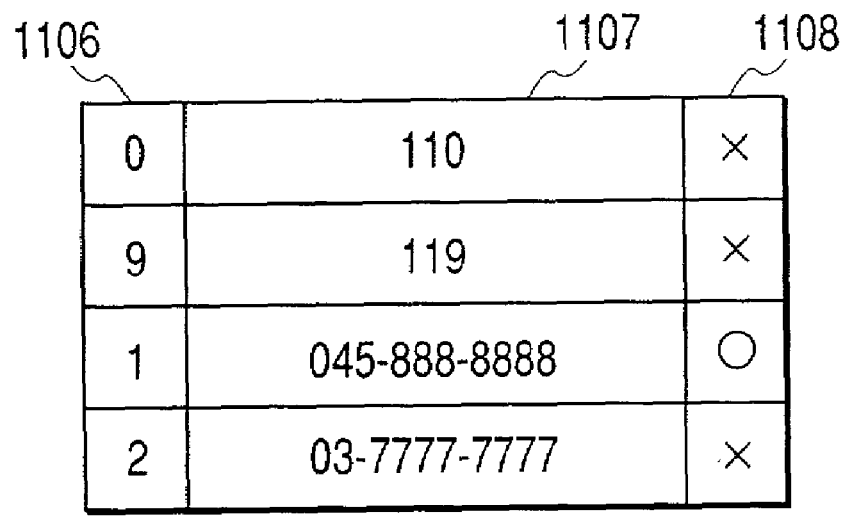
FIG. 12A is a table showing a first embodiment of the emergency telephone number table.

FIG. 11A is frontal views showing a first embodiment of the cellular telephone of the present invention. FIG. 12 is an emergency telephone number table. FIG. 12A shows the table of the first embodiment. To cancel the communication forbidden status during an emergency, the designated keys 1102 of the cellular telephone 1101 shown in FIG. 11A are pressed in a particular sequence. An answering mode cancel request signal is in this way automatically sent, and the telephone section is set to wake up status.

The tables in FIG. 12A are shown on the display 1105a of the cellular telephones 1101. The one-touch button No. 1106, telephone number 1107, mail yes/no 1108 are shown on the table in FIG. 12A. A ○ indicates usable and a x indicates non-usable on the mail yes/no 1108. During emergencies, telephone calls can be made only to the telephone numbers registered on these tables.

Adding an image when calling another party during an emergency will enable the other party to accurately understand the situation.

Figure 4:
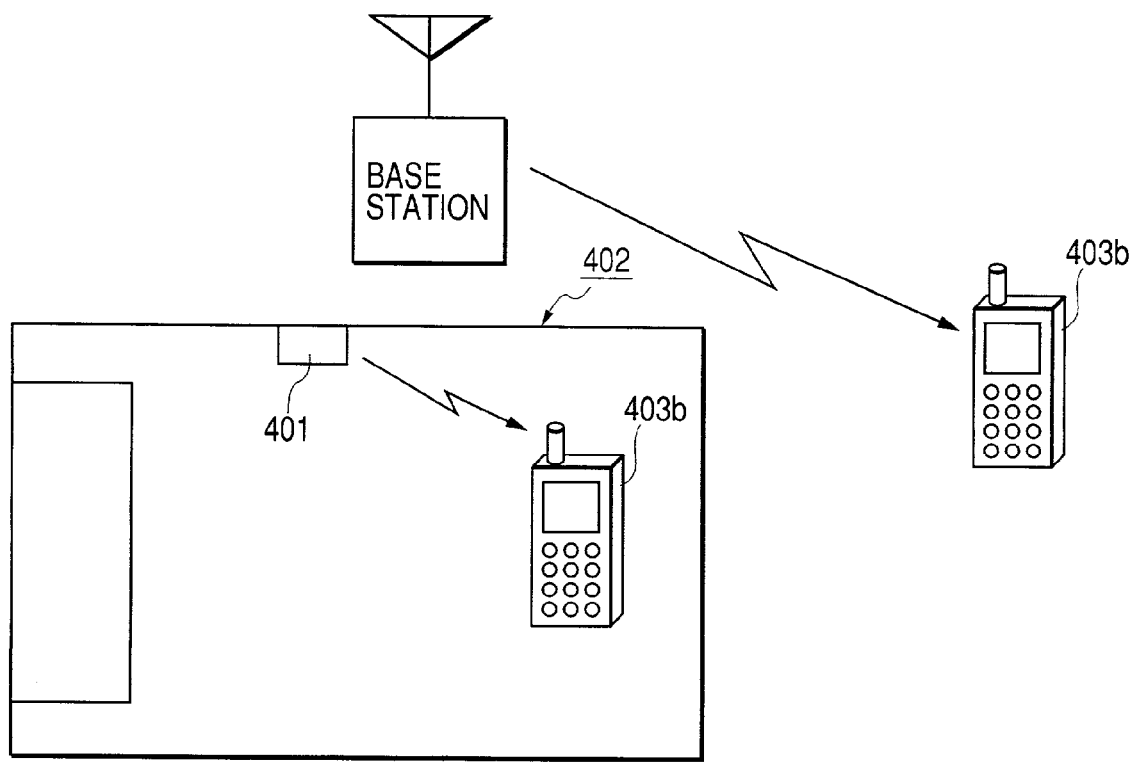
FIG. 4 is a concept diagram showing a second embodiment of the cellular telephone system of the present invention.

FIG. 4 is a concept diagram showing a second embodiment of the cellular telephone system of the present invention. In this embodiment, calls of the cellular telephone present within the designated area are automatically forbidden. The BT device 401 in the figure is installed to prohibit calls in the designated area. This designated area for example is a concert hall 402. The BT device 401 installed in the concert hall 402 inserts communication forbidding information in the format sent after the pilot. The cellular telephone 403a within range of the radio waves of BT 401, or in other words, all cellular telephones 403a in the concert hall receive communication forbidding information so that all the cellular telephones 403a automatically send an answering mode registration request signal, and the telephone sections are set to sleep status (RF section transmission is stopped) so that the cellular telephones 403a cannot make calls. When the cellular telephones 403b is brought outside of the communication forbidden area, the cellular telephones 403b can no longer receive communication forbidding information from the BT device 401 so that RF transmission starts, the telephone section is set to wake up status, an answering mode cancel request is sent, and answering messages are received and calls can be made. In this embodiment, the communication forbidden area was the concert hall 402, but the communication forbidden area is not limited to this and any applicable area may be a communication forbidden area.

Figure 11B:
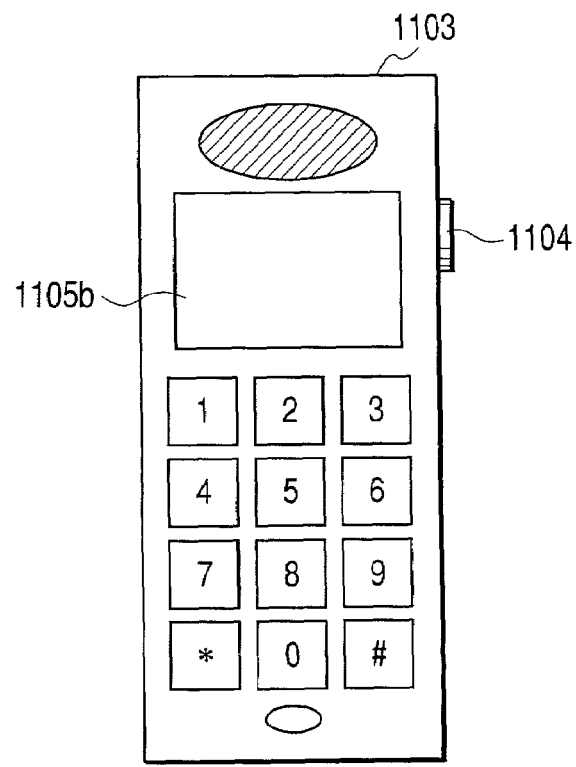
FIG. 11B is a front view showing a second embodiment of the cellular telephone of the present invention.
Figure 12B:
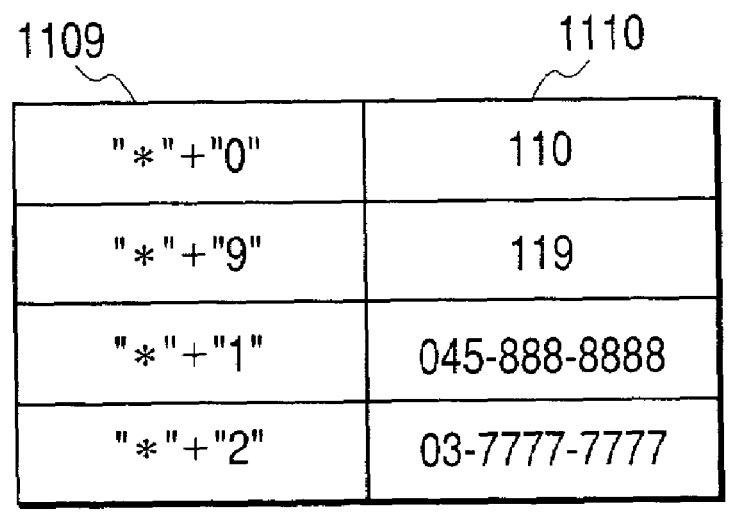
FIG. 12B is a table showing the second embodiment.

FIG. 11B is a frontal view showing a second embodiment of the cellular telephone. FIG. 12B shows the table of the second embodiment. To cancel the communication forbidden status during an emergency, as shown in FIG. 11B, the communication forbiddance cancel button 1104 on the cellular telephone 1103 is pressed. An answering mode cancel request signal is in this way automatically sent, and the telephone section is set to wake up status.

The tables in FIG. 12B are shown on the display 1105b of the cellular telephones 1103. A one-touch button 1109 and telephone No. 1110 are displayed on the table in FIG. 12B. During emergencies, telephone calls can be made only to the telephone numbers registered on these tables.

Adding an image when calling another party during an emergency will enable the other party to accurately understand the situation.

Figure 5:
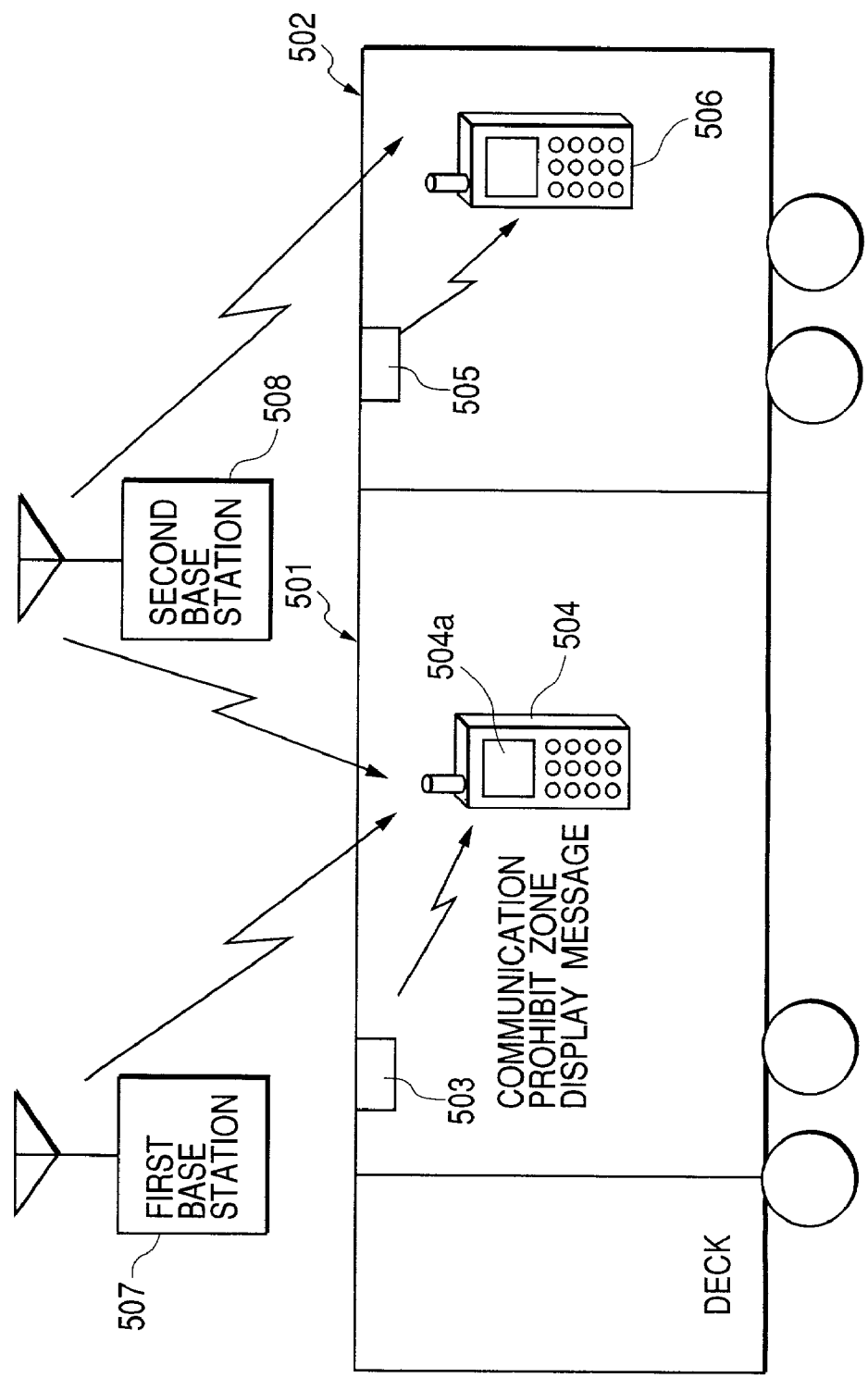
FIG. 5 is a concept diagram showing a third embodiment of the cellular telephone system of the present invention.

FIG. 5 is a concept diagram showing a third embodiment of the cellular telephone system of the present invention. An example is described for areas allowing calls (communication) and areas where calls are forbidden on a transportation means. In this embodiment, a train is the type of transportation having a train interior 501 where calls are forbidden and a deck 502 where calls are allowed. A BT device 503 is installed with the train interior 501, and this BT device 503 sends communication (call) forbidding information to each cellular telephone 504 in the train interior 504. Along with showing that the area is a communication forbidden area on the display (LCD) 504a of cellular telephone 504, an answering mode registration request signal is sent, and each cellular telephone 504 is set in sleep status. However, a BT device 505 is installed on the deck 502 and a communication allow signal is output from this BT device 505. The cellular telephone 506 in the deck 502 is capable of making calls so can be used as a cellular telephone as usual.

In this embodiment, an infrared transmitter may be used instead of the BT devices 503, 505. Further, communications with the first base station 507 or the second base station 508 may be carried out via a communication terminal (not shown in drawing).

Also in this embodiment, instead of the BT devices 503, 505, the cellular telephone 504 itself may recognize that the train is moving from the changes in radio frequency field strength received from the first base station 507 and second base station 508, and automatically send an answer mode registration request signal, and have the telephone section set in sleep status. In this case, the telephone section of cellular telephone 506 may also be set in sleep status in the same way, but in a train with no deck, setting all cellular telephones within the train to sleep status is advisable. That case is also effective in this embodiment.

An example is next described for setting a driver's cellular telephone to sleep status while driving an automobile.

FIG. 13 is perspective views and a flow chart showing the third embodiment of the cellular telephone capable of transmitting images. FIG. 13A is a perspective view from the front side. FIG. 13B is a perspective view from the rear side. A camera 1304 is housed in the cellular telephone 1301. A communication prohibit cancel button 1302, shutter 1303, and mirror 1305 are installed in the case. The display 1306 is used as a finder when shooting images.

FIG. 13C is a flow chart showing the processing during cellular telephone emergency operation. Pressing the communication forbiddance cancel button 1302 on the cellular telephone 1301 switches the cellular telephone 1301 to emergency mode in step 1311. When an image is shot with the camera 1304 in step 1312, the image is automatically sent to the address specified in step 1312, and the transmit log is automatically deleted instep 1314. The step to automatically delete the transmit log is not always necessary; however, this function may be convenient in situations where actions are subject to forcible restraint.

In the embodiments described up until now, the cellular telephone automatically set to answering mode in the communication forbidden area and the telephone section changed to sleep status, however the sound quality of the cellular telephone may also be made to deteriorate or the voice made difficult to hear.

Figure 6A:
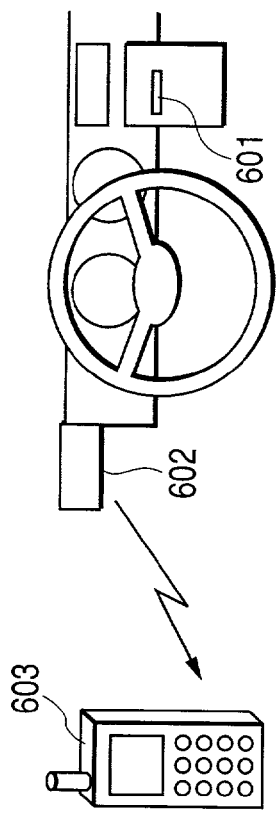
FIG. 6A and FIG. 6B are concept diagrams showing a fourth embodiment of the cellular telephone system of the present invention.
Figure 6B:
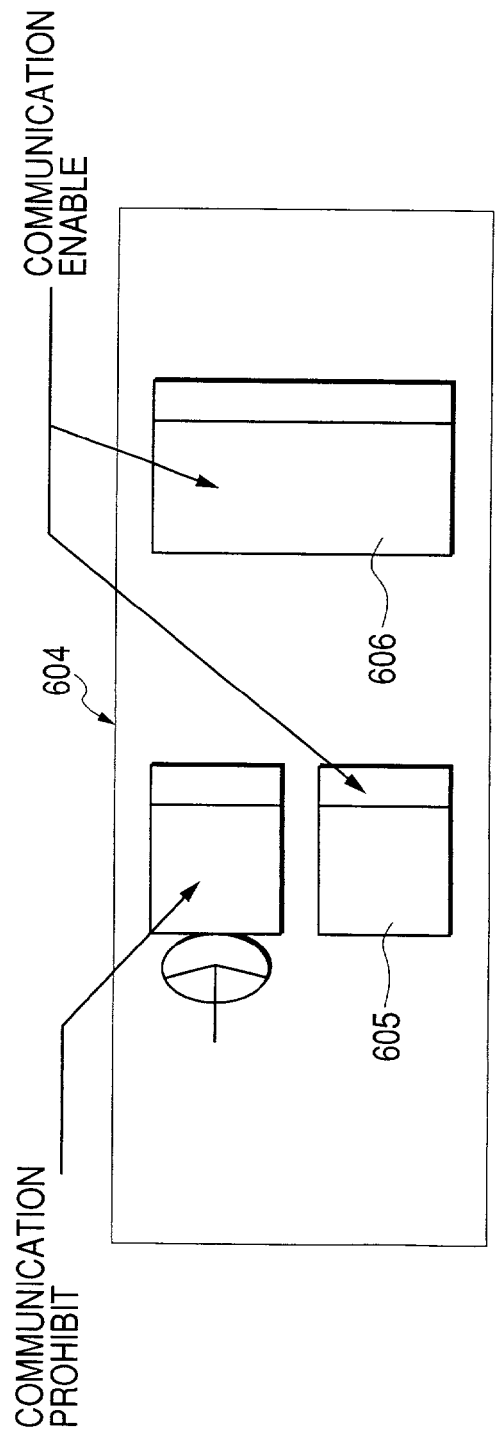

FIG. 6 is concept diagrams showing a fourth embodiment of the cellular telephone system of the present invention. In the figures, FIG. 6A is a frontal view of the driver's seat of the vehicle, FIG. 6B is a top view of the vehicle. In the example described here, only the cellular telephone of the driver currently driving the vehicle is set to communication prohibit, and the cellular telephones of the passengers in the same vehicle are set to allow normal operation. A driver license IC card is inserted into the IC card insertion slot 601 in the vehicle in this embodiment, and the ignition key turned to start the engine.

The telephone number of the driver's cellular telephone is entered on the IC card. The IC card also has the function of an ID card, and the user's own ID number is input on the IC card. Therefore, information that the area is a communication forbidden area can be sent from the BT device 602 to the cellular telephone 603 having the telephone number or the ID number input on the IC card, by inserting the IC card or a combination driver's license/IC card into the IC card insertion slot 601. When the cellular telephone of the driver receives the communication forbidden area information, an answering mode registration request signal is sent and the telephone section set in sleep status. The driver therefore cannot use the cellular telephone 603 while driving. In any of the following cases; when the engine is stopped, when the vehicle speed is zero, when parking lamp is on as shown by a flashing light, when the parking brake is engaged, the BT device 602 stops sending information on the communication forbidden area, so that the cellular telephone 603 sends an answering mode cancel request, and when the answering message is received, the cellular telephone 603 can be operated as usual. The cellular telephones of the passengers in the vehicle 604 are not sent a signal from the BT device 603 about the communication forbidden area so that the cellular telephones of the passenger in the passenger seat 605 and the passengers in the rear seat 606 can be operated as usual.

Figure 14:
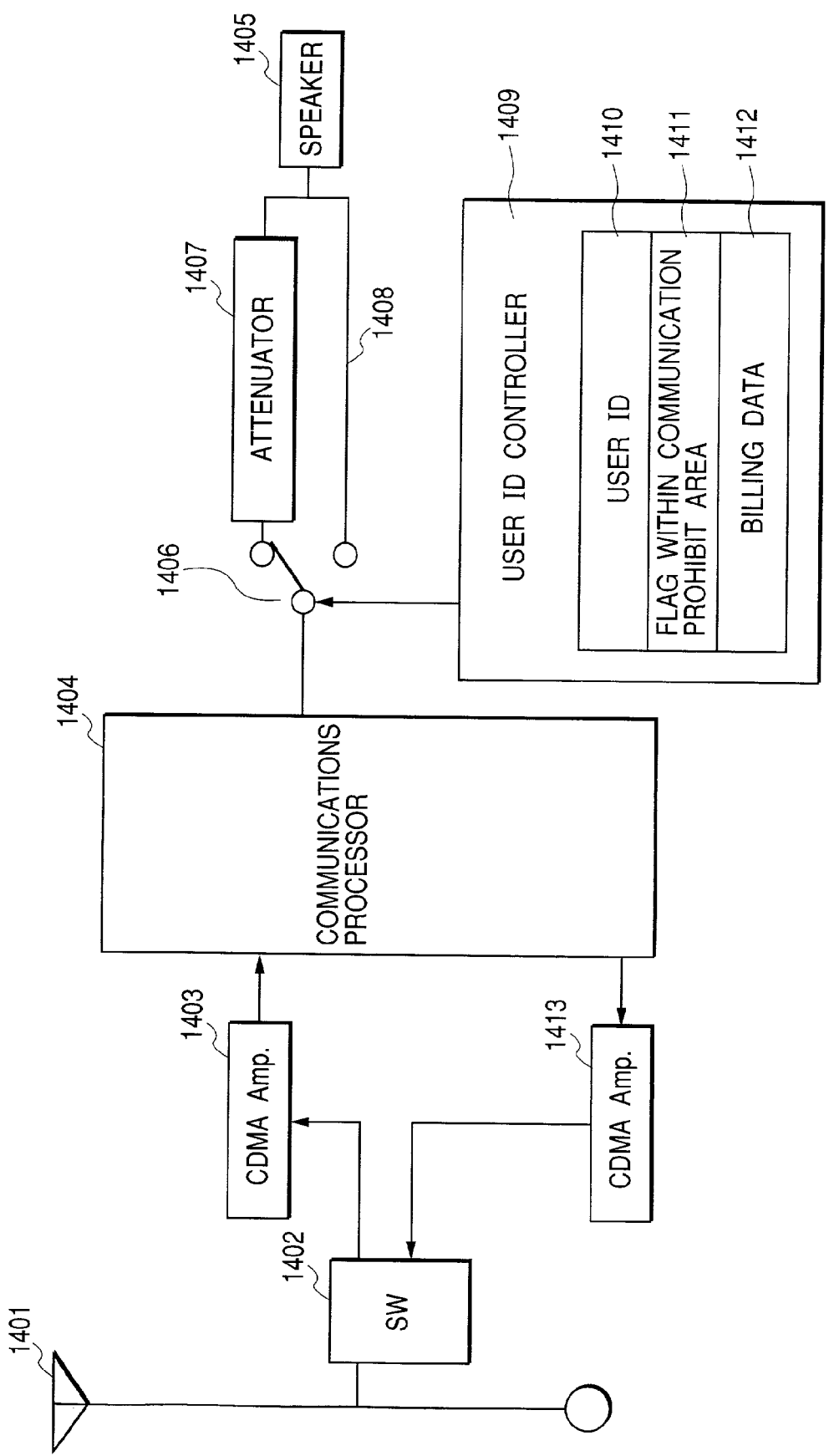
FIG. 14 is a block diagram showing a fourth embodiment of the cellular telephone of the present invention.

FIG. 14 is a block diagram showing a fourth embodiment of the cellular telephone of the present invention. The CDMA signal received by way of the antenna 401 is input by way of the transmit/receive selector switch 1402, and the CDMA amplifier 1403 to the communications processor 1404. A switch 1404 can connect an attenuator 1407 between the communications processor 1404 and the speaker 1405 or can directly connect the communications processor 1404 to the speaker 1405. The switch 1406 is switched by a user ID controller 1409. The user ID 1410, the within-communication-forbidden area flag 1411, and the billing data 1412 are recorded in the user ID controller 1409.

In the present embodiment, when the cellular telephone is within the communication forbidden area, the switch 1406 connects to the attenuator 1407 side when triggered by the within-communication-forbidden area flag 1411. So if the voice signal is output from the speaker 1405 in this weakened (attenuated) state, the sound quality and volume will be poor.

The within-communication-forbidden area flag 1411 is not output when the emergency telephone mode is set, so the switch 1406 is connected directly to the speaker 1405 and voices can be heard normally.

The transmitted voice audio is sent via the CDMA amplifier 1413, and switch 1402 to the antenna 1401.

Figure 15:
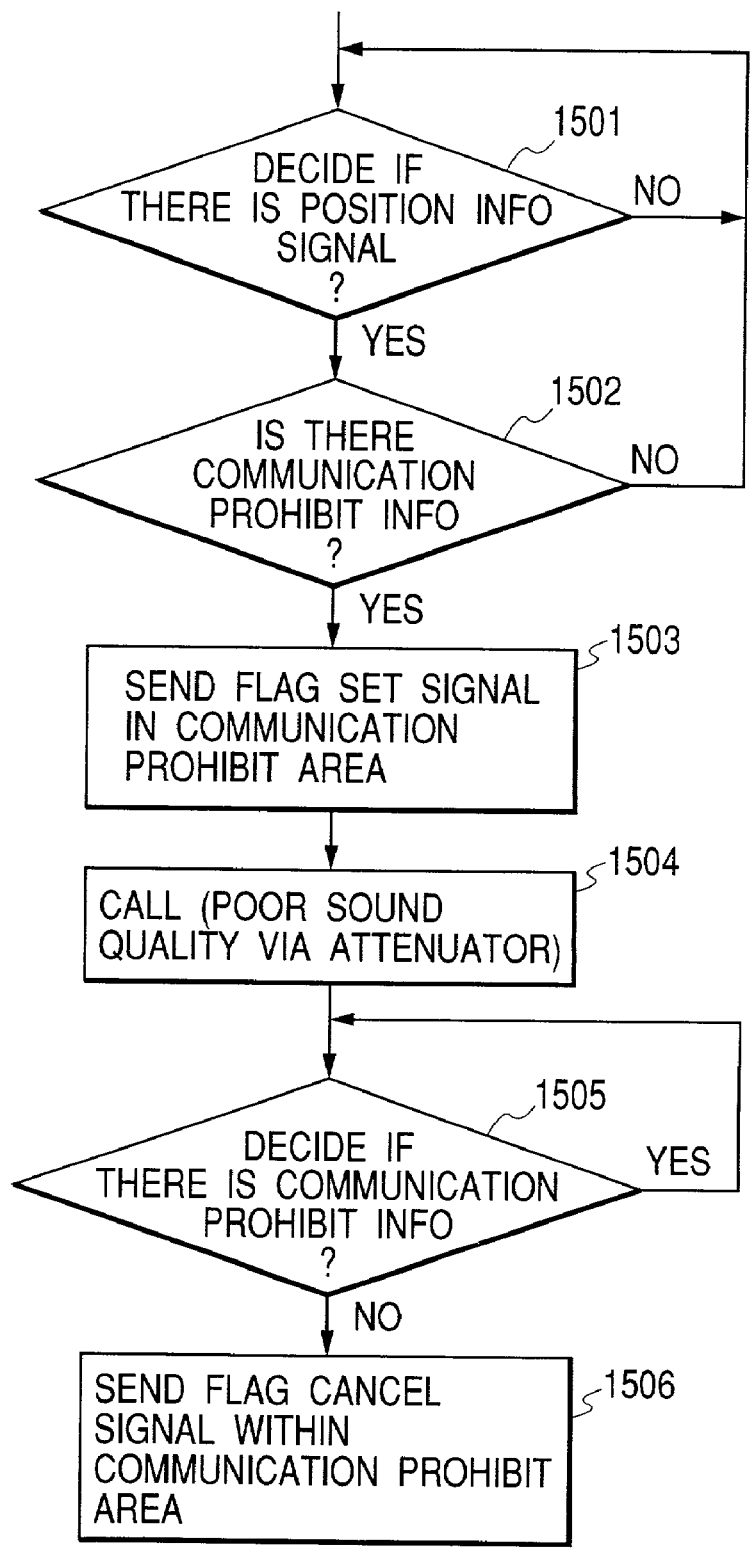
FIG. 15 is a flow chart showing an embodiment of the processing in the cellular telephone shown in FIG. 14.

FIG. 15 is a flow chart showing an embodiment of the processing in the cellular telephone shown in FIG. 14. In step 1501 in the figure, whether or not a position information signal was received from the BT device is determined. This operation is repeated if there is no position information signal. If there is a position information signal then whether or not communication forbidding information is contained in the position information signal is determined in step 1502. If there is communication forbidding information then the process shifts to step 1503, and a signal to set a flag showing communication forbidding information is present is sent. The process next proceeds to step 1504, and the switch 1406 set to the attenuator 1407 so that the telephone call is carried out by way of the attenuator 1407 and the sound quality becomes poor. After the telephone call in step 1504, a decision is also made whether or not communication forbidding information is present, and when communication forbidding information is present, then whether or not there is communication forbidding information is constantly check in this step. In step 1505, when there is no longer any communication forbidding information, the process proceeds to step 1506, and a signal is sent to cancel the within-communication-forbidden area flag 1411. By sending this signal to cancel the within-communication-forbidden area flag 1411, the speaker 1405 is directly connected and the telephone call can be heard with high voice quality.

The sound quality was made worse by connecting an attenuator 1407, when a communication or call was made within the communication forbidden area, however the telephone call charge (rate) may be increased instead of making the sound quality poor.

An example for forbidding use of the cellular telephone only when a movie is shown in the movie theater is described next.

FIG. 7A is a concept view showing a fifth embodiment of the cellular telephone system of the present invention, FIG. 7B shows the cellular telephone table, and FIG. 7C is a drawing showing the communication forbidden time period. A cellular telephone 701 in the figure has a function for utilizing electronic money and an account settlement function, and an admission ticket for the movie hall 702 is purchased by the cellular telephone 701. When the admission ticket is purchased, a ticket ID 704, a movie start time 705, movie end time 706 shown in FIG. 7B, sent from the BT device 703 to the cellular telephone 701 are stored in a memory 31 (see FIG. 2), and a voice answering message 704 for requesting registration of answering mode is sent from the cellular telephone 701, and the cellular telephone 701 is set to communication prohibit mode 708. The movie running time period in this way prohibits communication or making calls (including phone calls or mail communication) in this way as shown in FIG. 7C.

When stopping calls during the movie running time period as shown above, entering several typical responses in the answering server of the base station will prove convenient for making different responses according to the other party. An example is next described while referring to FIG. 8. FIG. 8A is drawing showing a main data table from typical data required in responses in answering mode. FIG. 8B is a table showing typical responses. As shown in FIG. 8A, the memory address of the other party, full name 802, telephone number 803, E-mail address 804, and message level 805 are stored in the memory 31. As shown in FIG. 8B, each message level, for example the level of stage 5 is stored in the memory 31. As shown in level 1, a "No response" level 807 is for cases where the other party requires no particular response. Level 2 is a simple message, "Unable to answer the phone" sent for level 808. The message of level 3, "Unable to come to the phone, please leave a message" in level 809 is a message urging a response. The message of level 4 "Now seeing a movie" of level 810 is for contact about current circumstances. The message of level 5 is for an extremely intimate person, "Now watching a movie. It will end at X:xx." is a level 811 message for informing another person of the time when the communication to the cellular telephone will be available. During an answering mode registration request in the communication forbidden area, the table contents of FIG. 8A and FIG. 8B are sent, entered in the answering server 7 of the base station (see FIG. 1) and stored. Therefore, even when communication on the cellular telephone is forbidden, messages from level 1 through 5 are selected according to the other party and sent.

An example of forbidding communication of the cellular telephone by smell is described next.

Figure 16:
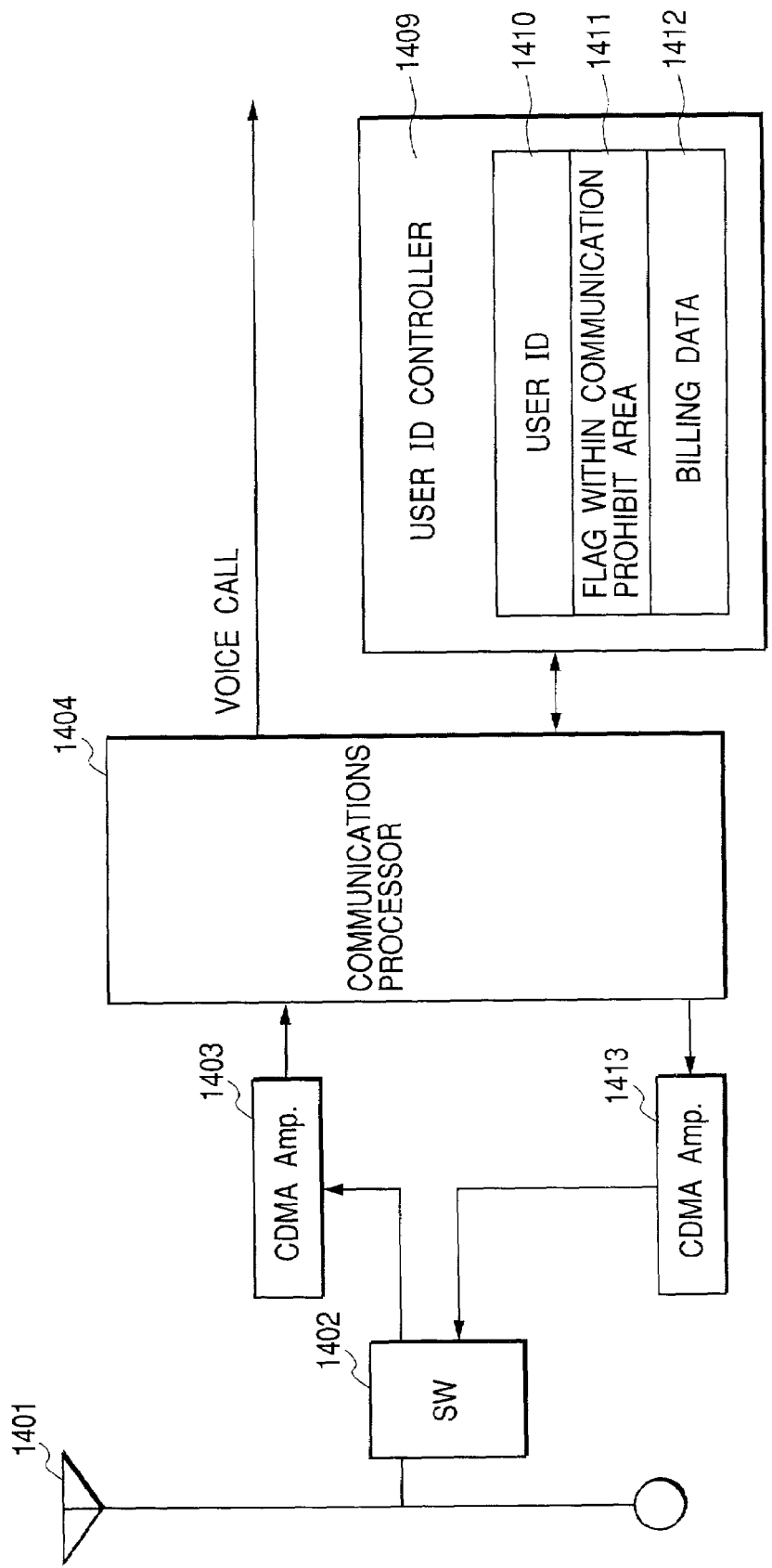
FIG. 16 is a block diagram showing a fifth embodiment of the cellular telephone of the present invention.

FIG. 16 is a block diagram showing a fifth embodiment of the cellular telephone of the present invention. In contrast to FIG. 14, the switch 1406 and attenuator 1407 have been removed and software incorporated into the billing data 1412 to raise the call fee (rate) within the communication forbidden area. Therefore, the call fee (rate) is automatically increased when there is a signal setting the within-communication-forbidden area flag 1411.

FIG. 17 is a flow chart showing an embodiment of the processing in the cellular telephone shown in FIG. 16. In contrast to the flow chart in FIG. 16, this embodiment differs in the point that a step 1701 is provided instead of step 1504. Steps 1501 through 1503 in the figure are identical to FIG. 15 so that description is omitted. When a signal to set the flag showing the cellular telephone is within the communication forbidden area is sent, along with showing on the cellular telephone display that the communication or call rate fee is increased, the telephone call billing settings are rewritten in step 1701, so that the call fee (rate) for making calls (communication including calls or mail according to the particular case) within the communication forbidden area is increased. Next, the steps 1505 and 1506 are the same as in FIG. 15 so a description is omitted.

As for communication forbidden areas, they include areas where both telephone calls and mail by cellular telephone are forbidden, and areas where telephone calls are forbidden but mail is allowed. The former areas include hospitals for example, for forbidding communication and telephone calls, where transmission in the RF section must be turned off, and the telephone section must to be set to sleep status. The letter areas where telephone calls are forbidden but communication (mail) is permitted include movie theaters, where the silent mode is set but the RF section continues transmission (oscillation), and mail is permitted. Even in the same location, for example a movie theater, there are occasions where telephone calls and communications are both forbidden, and there are also occasions where only telephone calls are forbidden, it is preferable for the user to be able to select according to location, when to set the cellular telephone to sleep status, and continue RF section transmission (oscillation), or when to set the telephone section to complete sleep status. When using BT devices, either may be selected according to the signal sent from the BT device.

Figure 9:
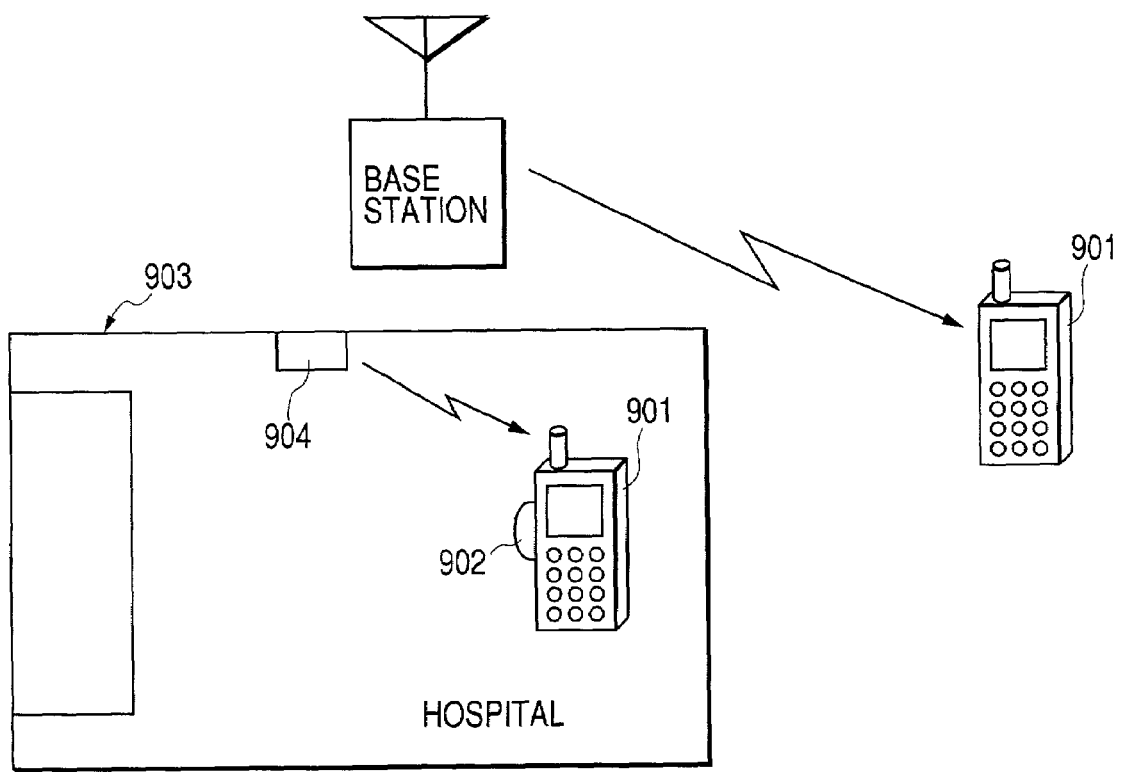
FIG. 9 is a concept diagram showing the sixth embodiment of the cellular telephone system of the present invention.

FIG. 9 is a concept diagram showing the sixth embodiment of the cellular telephone system of the present invention. This is an area issuing a designated smell (or odor). To make this area a communication forbidden area, a smell sensor 902 is added to the cellular telephone 901, and when this smell sensor 902 detects smell or odor greater than a certain level, an answering mode registration request signal is automatically sent, and the telephone section set to sleep status, and when the smell can no longer be detected by the smell sensor 902, for example when having gone outside the communication forbidden area 903, then the answering mode is automatically canceled.

Alternatively, a smell generator 904 may be installed in the communication forbidden area 903 where forbidding of communications from the cellular telephone 901 is needed. The smell (odor) emitted by the smell generator 904 may for example be a unique smell but preferably is a smell to make people feel peaceful or relaxed. A smell of this type may be added to the cellular telephone 901 for detection by the smell sensor 902, and an answering mode registration is requested when the smell sensor 902 detects the smell.

In exceptional cases, being able to communicate only with a predesignated other party during emergencies is necessary even in locations where cellular telephone communication is forbidden. For example, when a calamity has occurred or when a crime has occurred, etc.

Figure 10:
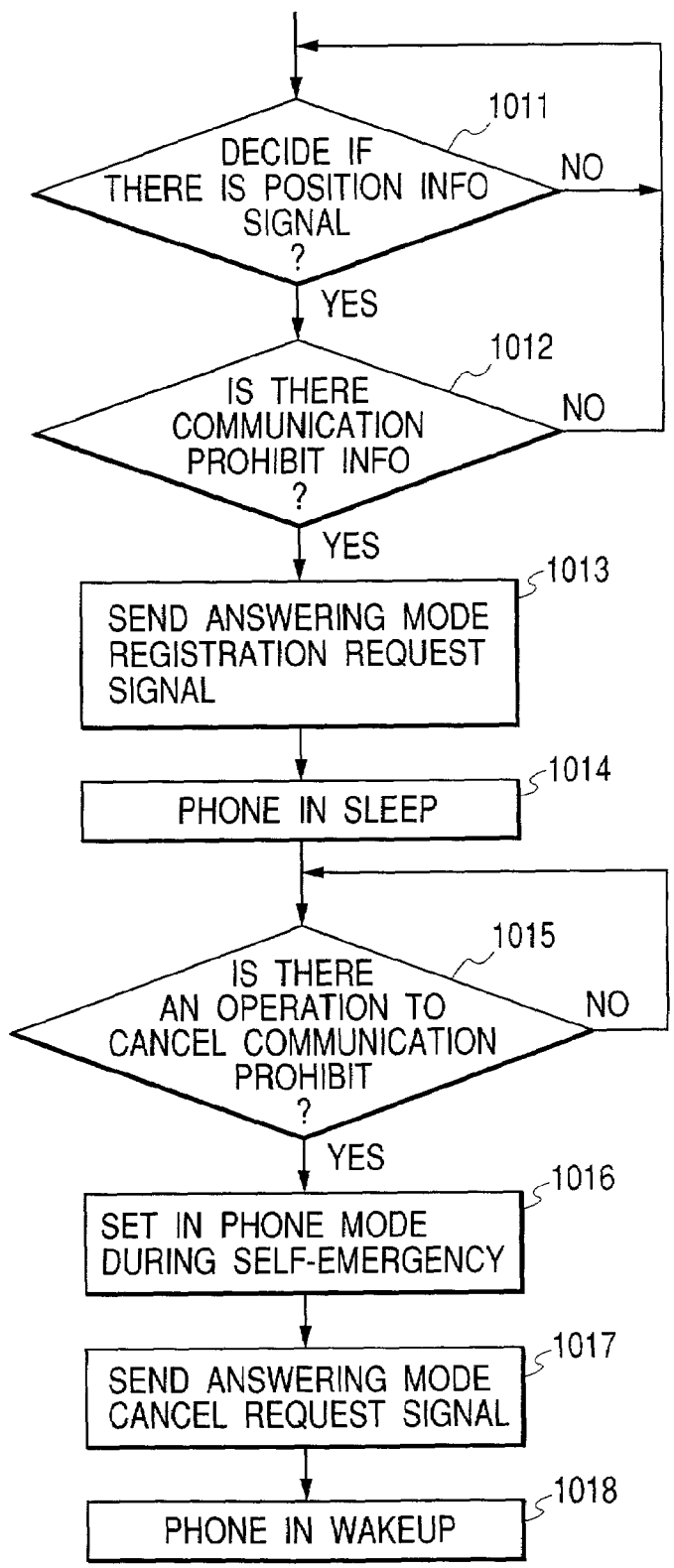
FIG. 10 is a flow chart showing an example of emergency call processing in the communication forbidden area of the cellular telephone.

FIG. 10 is a flow chart showing an example of the emergency call processing in a communication forbidden area of the cellular telephone. In step 1011 in the figure, whether or not the position information signal from the BT device was received is determined. When there is no position information signal, the operation is repeated. When there is a position information signal, whether or not the position information signal contains communication forbidding information is determined in step 1012. When there is communication forbidding information, the process shifts to step 1013, an answering mode registration request signal is set, and in step 1014, the telephone section of the cellular telephone is set to sleep status, or in other words, set so that no radio waves are output. When a situation occurs where an emergency telephone call is needed, the communication forbidden status is canceled in step 1015. A combination of designated keys for example, are pressed in order to cancel communication forbidden status. A button installed at a location not normally touched may also be pressed.

In step 1016, after setting the cellular telephone in phone mode for a self-emergency, an answering mode cancel request signal is sent in step 1017, the telephone section is set to wake up status in step 1018, and the call is commenced.

There is a limit on the other parties to phone during an emergency so entering an emergency telephone list in the cellular telephone memory will prove convenient.

In the present invention as described above, the cellular telephone can be switched on and off making the user free from being aware of areas (zones) where cellular telephone use is forbidden, and therefore accidents occurring due to radio wave interference and accidents occurring from cellular telephone use due to a lack in concentration can be prevented and behavior when using the telephone (phone manners) can be enhanced.

The present invention as described above, is therefore capable of automatically stopping telephone call or communication functions in areas where telephone calls or communication by cellular telephone are forbidden.

The present invention may be embodied in other specific forms without departing from the spirit or essential characteristics thereof. The present embodiment is therefore to be considered in all respects as illustrative and not restrictive, the scope of the invention being indicated by the appended rather than by the foregoing description and all changes which come within the meaning and range of the equivalency of the claims are therefore intended to be embraced therein.

What is claimed is:

1. A cellular telephone device comprising:
a radio-frequency device including a telephone section for sending and receiving radio frequency communication signals; and,
a processor for controlling said radio frequency device to perform the steps of:
responsive to receiving communication forbidding information to enter a communication prohibit mode:
sending an answering mode registration request signal to initiate an answering mode, and
maintaining said telephone device in a sleep status; and
responsive to not receiving said communication forbidding information:
restoring said telephone section in to an operation status;
sending an answering mode cancel request signal; and
receiving an answering message;
whereby a cancellation of the answering mode is initiated,
wherein said processor controls to set an emergency telephone mode by executing an operation to cancel the communication prohibit mode when said telephone section is in said sleep status.

2. The cellular telephone device according to claim 1 further comprising a communication prohibit cancel button; wherein said processor controls said radio frequency device to set said emergency telephone mode when said communication prohibit cancel button is pressed.

* * * * *